United States Patent [19]

Rousar

[11] Patent Number: 5,104,612
[45] Date of Patent: Apr. 14, 1992

[54] FUEL HANDLING GRAPPLE FOR NUCLEAR REACTOR PLANTS

[75] Inventor: David L. Rousar, San Jose, Calif.

[73] Assignee: General Electric Company, San Jose, Calif.

[21] Appl. No.: 685,779

[22] Filed: Apr. 16, 1991

[51] Int. Cl.⁵ .............................................. G21C 17/08
[52] U.S. Cl. ..................................... 376/248; 376/288
[58] Field of Search ............... 376/263, 264, 268, 248, 376/288

[56] References Cited

U.S. PATENT DOCUMENTS 5,028,379  7/1991  Faulstich ............................ 376/248

Primary Examiner—Brooks H. Hunt
Assistant Examiner—Frederick H. Voss
Attorney, Agent, or Firm—Robert R. Schroeder

[57] ABSTRACT

A fuel handling system for nuclear reactor plants comprising an improved underwater grapple means for transferring fuel units while submerged within a water containing reactor vessel. Wherein a novel structure is provided which allows for direct viewing downward for operating the grapple hooks.

10 Claims, 3 Drawing Sheets

5,104,612

FUEL HANDLING GRAPPLE FOR NUCLEAR REACTOR PLANTS

FIELD OF THE INVENTION

This invention relates to an improvement in the mechanical means for refueling power generating nuclear reactor plants such as the conventional water cooled and moderated boiling water and pressure water systems. The invention comprises a unique apparatus for handling nuclear fuel bundle units underwater within the nuclear reactor vessel, including a remotely operable grapple provided with a viewing means for grasping and transfer fuel bundles while submerged underwater.

BACKGROUND OF THE INVENTIONS

Typical water cooled and moderated nuclear reactor plants for power generation comprise a large pressure vessel containing cooling and neutron moderating water, and have a heat generating core of fissionable fuel submerged a substantial distance beneath the surface of the cooling and moderating water. The submerged fissionable fuel of the core must be periodically replaced, including the removal of spent fuel and replacement with new fuel, as well as rearranging partially spent fuel within the core. Due to the high levels of radioactivity within the nuclear reactor pressure vessel, the means for handling the water submerged fuel must be remotely controlled by an operator from out beyond the water containing reactor pressure vessel.

Conventional fuel handling systems comprise a fuel handling mast or pole extending down from above an open top of the water containing reactor pressure vessel with a grapple head affixed to the lower end of the mast. The system is designed for attachment to fuel bundles and their transfer while submerged in the reactor vessel to remove spent fuel and introduce new fuel, and rearrange fuel bundles within the core. The fuel handling mast is frequently supported on and operated from a movable platform which can travel back and forth over an open top of the water containing reactor vessel above the fuel core. Typically the fuel handling mast is mechanically telescoping downward from the supporting movable platform to facilitate reciprocal travel of the grapple head affixed to the lower end of the mast down into and back up from the interior of the reactor vessel. This arrangement provides greater versatility for transferring fuel bundles within and about the reactor vessel.

To facilitate operating personnel in manipulating such fuel handling systems with the grappling devices submerged a substantial depth below the surface of the water containing reactor vessel from a safe position above the open top of the reactor vessel, underwater viewing means are commonly employed. For example, underwater periscopes or television cameras suspended on a pole and connected to an above surface monitoring screen have been utilized for enabling remotely located operators to more accurately and clearly observe their underwater manipulation and relative location of the grappling head on the mast with respect to fuel assemblies to be transferred, and its application to fuel bundles.

However, controlling the manipulation of two distinct underwater units and their coordination by a remotely located operator is cumbersome and slow, and space limitations sometimes impede positioning of such underwater viewing mechanisms in conjunction with the fuel handling means.

Fuel bundles for typical water cooled and moderated nuclear reactor plants used to generate power commonly consist of a multiplicity of small diameter sealed tubes elements enclosing fissionable fuel which are grouped, spaced apart, into an assembled unit. Each assembled unit of the grouped tube elements is provided with an upper and lower end piece having sockets to receive and secure the end portions of the grouped tube elements, and the overall assembled unit is substantially surrounded with an open ended housing or channel unit. A handle or bail is provided on the upper end piece of the assembled units for convenient and effective graphing and secure attachment of a transferring means such as a grapple device. The identification number of each assembled unit or fuel bundle is stamped on the top of its bail.

The grouping of a multiplicity of the fuel containing tube elements in assembled units greatly facilitates the transfer of fuel in reloading operations, among other benefits.

SUMMARY OF THE INVENTION

This invention comprises an improved means for handling fuel bundles within the water containing vessel of a nuclear reactor plant. The invention comprises a composite arrangement of a mast with a grapple head mounted on the lower end thereof and having a viewing camera associated with the grapple head for observing submerged fuel bundles and transferring the bundles underwater.

OBJECTS OF THE INVENTION

It is a primary object of this invention to provide an improved fuel handling system for nuclear reactor plants.

It is another object of this invention to provide a unique fuel handling system for transferring fuel bundles underwater within the enclosing pressure vessel of a water cooled and moderated nuclear reactor plant.

It is a further object of this invention to provide a fuel handling system for water cooled and moderated nuclear reactor plants employing improved means for viewing underwater when carrying out the transfer of fuel bundles submerged within the water containing pressure vessel of the nuclear reactor.

It is a still further object of this invention to provide a composite system for handling fuel bundles underwater within a nuclear reactor including an underwater grappling means combined with a viewing camera and improved viewing and/or illuminating measures.

It is also an object of this invention to provide an underwater fuel handling system for nuclear reactors having a camera associated with grappling means for close, distortion free viewing of all underwater work performed with the handling system.

DETAILED DESCRIPTION OF THE INVENTION

Figure 1:
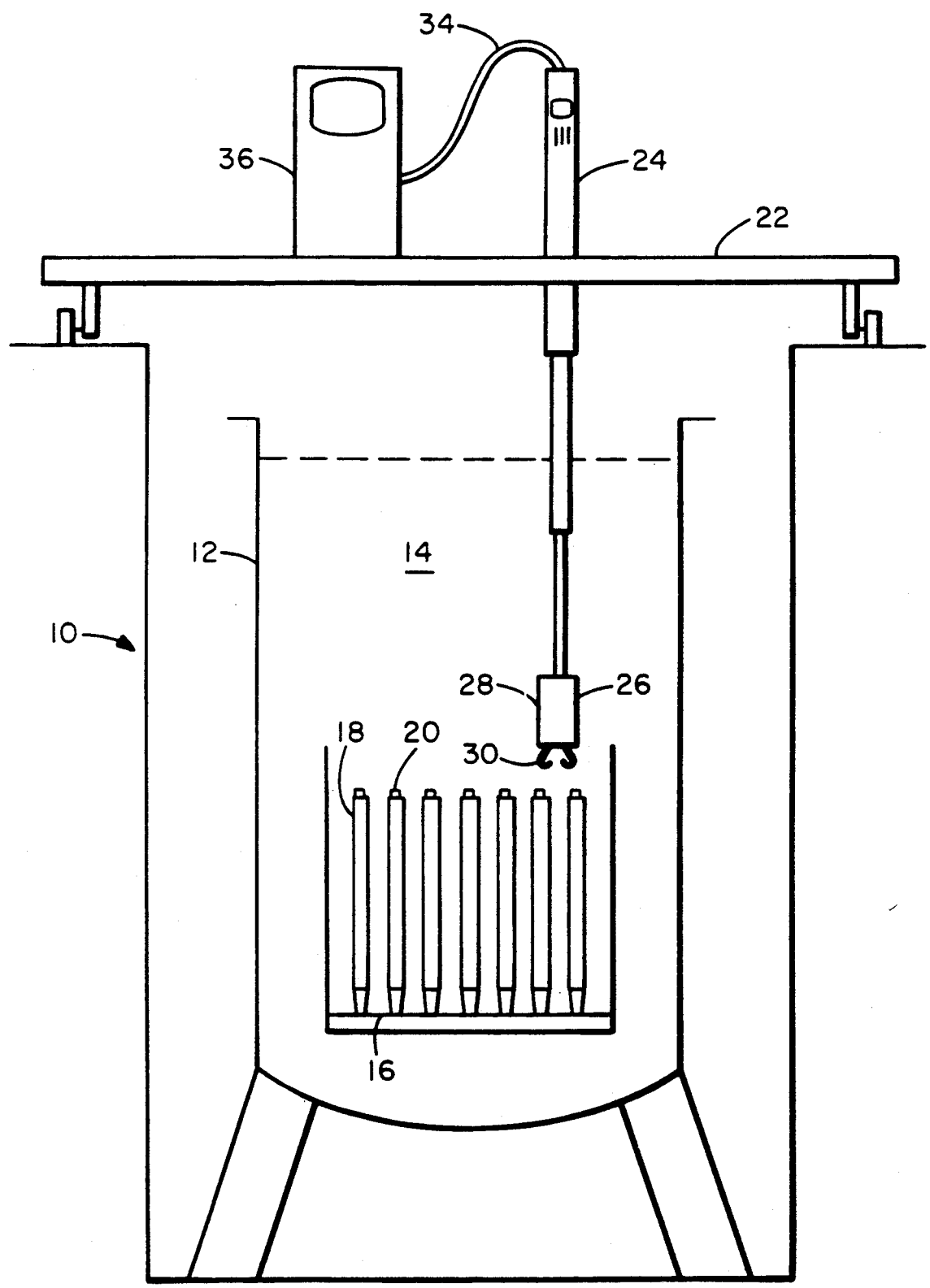
FIG. 1 of the drawings comprise a schematic illustration of a cross-section of a water cooled and moderated nuclear reactor plant.

Referring to the drawing, FIG. 1 in particular, a typical power generating, water cooled and moderated nuclear reactor plant 10, comprises a reactor pressure vessel 12, having a removable top (not shown) which closes and seals the pressure vessel during operating of the reactor. The removable top of the pressure vessel is disconnected and deposited elsewhere during shutdowns for refueling and/or maintenance service. Reactor pressure vessel 12 is substantially filled with water 14 for moderating the fission produced neutrons, cooling the heat produced by the fissions reaction of the fuel and transferring the generated heat energy in the form of steam or pressurized hot water to means for conversion into mechanical work, such as a turbine.

A fuel core 16 is located within the reactor vessel 12 submerged within the coolant/moderator water 14. The fuel core 16 is composed of a multiplicity of fuel bundles 18, each comprising a group of spaced apart sealed tube containers enclosing fissionable fuel and assembled and secured together in a composite unit. The upper end of the fuel bundle is provided with an end piece having a bail-like handle 20 for grasping by mechanical means to enable secure handling and transporting of the fuel bundles 18 when needed for refueling or rearranging partially spent fuel of the fuel core 16.

To facilitate handling and transferring of fuel bundles 18 for refueling and/or fuel rearrangement of the core 16, reactor plants 10 commonly employ a fuel bundle handling platform 22. The fuel handling platform 22 usually comprises a platform which bridges across the top of the reactor vessel cavity and the reactor vessel 12 and is movable back and forth over the top of the reactor vessel cavity and the reactor vessel 12 on suitable means such as wheels and track. The movable platform 22 enables operating personnel working thereon to be positioned at any location above any fuel bundle 18 within the fuel core 16 for servicing.

A fuel bundle handling mast 24 is supported by and movable about on the fuel bundle handling platform 22, and is extendable downward therefrom into the reactor vessel 12 and the water 14 contained therein to just above the fuel core 16. The mast 24 can be arranged with the full length thereof sliding up and down to reach the core and retract therefrom, or telescoping in structure whereby it expands downward to reach the core and contracts upward therefrom.

A grapple head 26 is mounted fixed on the lower end of the fuel handling mast 24 for reaching down into the reactor vessel 12 and its water 14 contents for grasping the fuel bundle handles 20 to lift and transport the fuel bundles 18. The grapple head 26 comprises a housing 28 including complementary hooks 30 for attaching to handles 20 and securely grasping the fuel bundles 18 for transfer. Both the mast 24 and grapple hooks 30 of head 26 are operated remotely by personnel located above the reactor vessel 12, such as on the fuel bundle handling platform 22.

In accordance with this invention, a television camera or the like remote viewing means 32 is enclosed within the housing 28 of the grapple head 26. Camera or other viewing means 32 is provided with a transmitting and control cable 34 extending from the camera up the mast 24 to the movable platform 22 for personnel performing on the platform to observe underwater through the camera or viewing means 32 and operate the camera and underwater lighting to enhance the view. The camera cable 34 is connected to a television monitor, such as monitor 36, for viewing by operating personnel, and/or a small screen viewing monitor can be affixed to the upper end of the handling mast 24 for the convenience of the personnel operating the grapple 26 through the mast.

The camera or viewing mean 32 is located within the upper portion of the grapple head housing above the grapple hooks 30 whereby it does not interfere with the mechanism or operation of the grapple hooks, which can be of conventional design.

Figure 2:
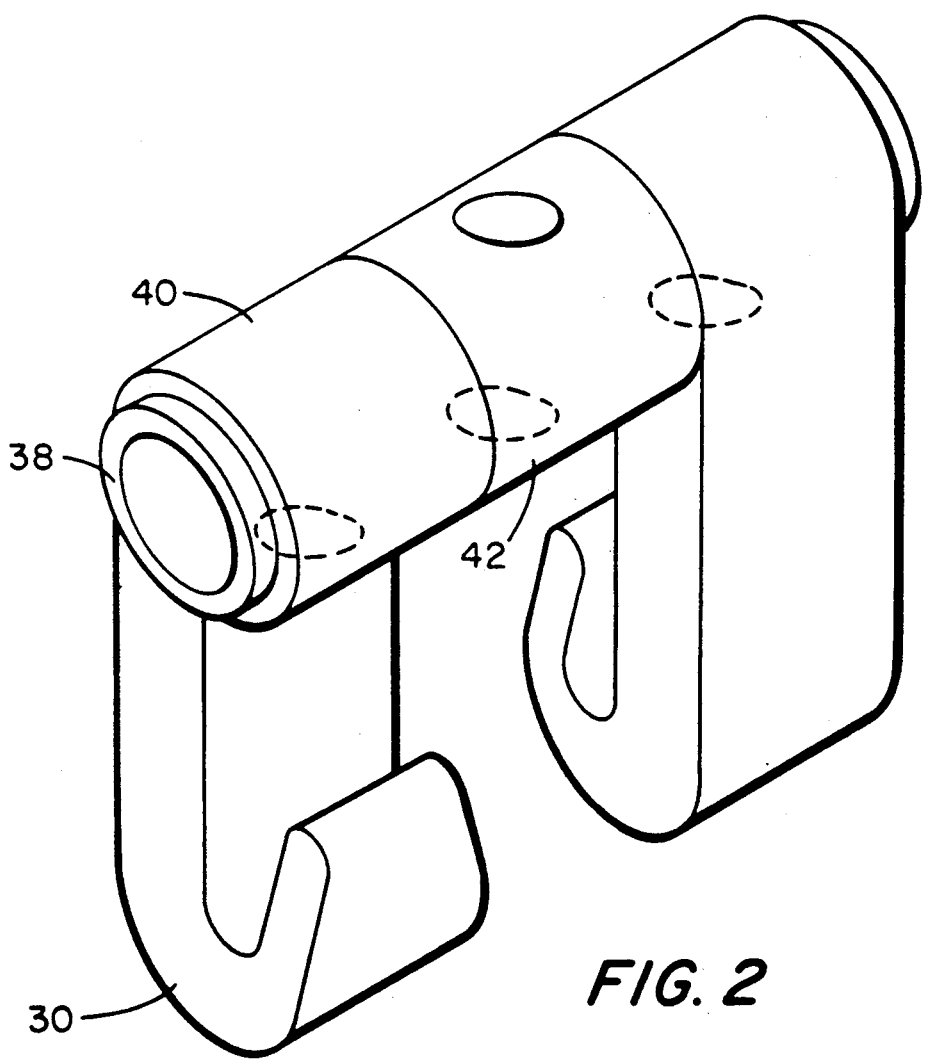
FIG. 2 of the drawings comprise a perspective view of a grapple means mounted on a mast for underwater service.
Figure 3:
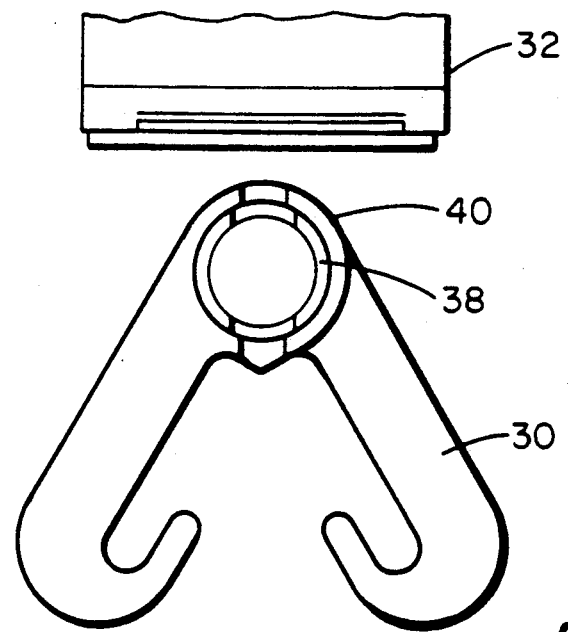
FIG. 3 of the drawings comprise a cross sectional view along line 3—3 of FIG. 2 of a portion of a grapple means mounted on a mast and, FIG. 4 of the drawings comprises a cross sectional view along line 4—4 of FIG. 2 of a grapple means and an upper portion of a fuel bundle.
Figure 4:
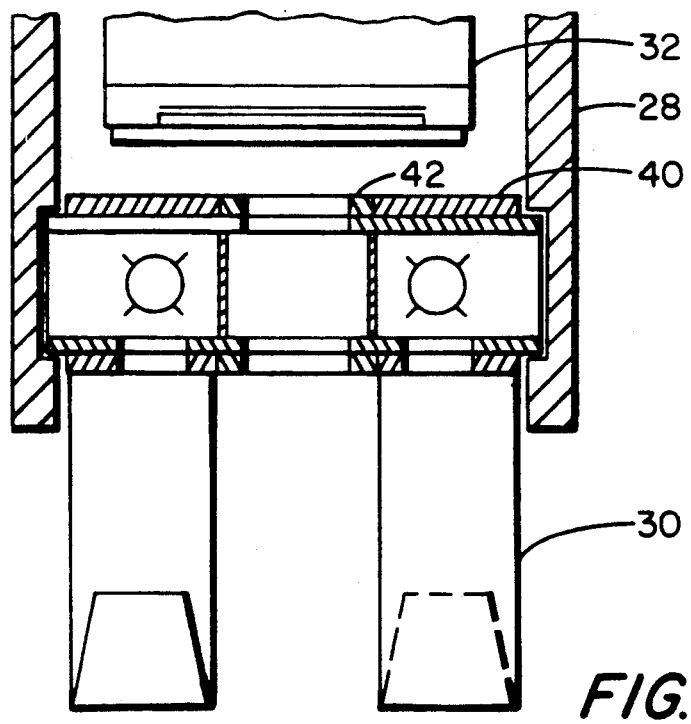

Referring to FIGS. 2, 3 and 4 of the drawings, a generally horizontal support shaft 38, comprising a hollow cylinder is secured within the grapple housing 28 for supporting the hook 30 mechanism. Hollow cylindrical sleeves 40 are rotatably mounted on and around support shaft 38, with a sleeve attached to one of at least two complementary hooks 30. Rotatably mounted sleeves 40 are fixed in longitudinal axial positions on the support shaft 38, preferably each hook carrying sleeve being located adjacent to an end of the support shaft, and spaced a distance apart. A spacing sleeve 42 ca be positioned between sleeves 40 on shaft 38 to provide for apt spacing of the sleeve units. Thus arranged, with the rotation of sleeves 40 mounted on shaft 38 over a short arc, the pair of grapple hooks 30 pivot inward toward each other for the purpose of securely grasping a bail handle 20 of a fuel bundle and safely transporting same, then pivot backward away from each other to release a bail handle 20 of a fuel bundle to deposit the bundle at a suitable location.

One version of this invention comprises a centrally positioned sleeve 40 with an integrated hook 30 directed in one direction and a pair of end positioned sleeves 40, one on each side of the central sleeve, with each of said end sleeve having a hook 30 directed in the opposite direction of the center hook 30. Thus the outer pair of hooks 30 face the center hook 30 which faces the pair of hooks whereby they complement each other to securely close upon each other and grasp a bail handle.

Further in accordance with this invention, the hollow cylindrical support shaft 38 is provided with a pair of complementary orifices 44, positioned generally in a central area in the support shaft 38 between the sleeves 40, one orifice being located in the upper portion of the cylindrical shaft 38 and the other orifice opposite thereto in the lower portion of the cylindrical shaft. The paired upper and lower orifices 44 are vertically aligned one over the other to provide a direct in-line optical viewing path or line of sight downward through the center of generally horizontal support shaft 38 from above. Thus, a remote operator positioned above the grapple means can observe from overhead the area immediately below the grapple hooks 30 by a variety of means including a television camera 32 located above the grapple hooks 30.

When a spacing sleeve 42 is employed mounted on the support shaft 38 between the sleeves 40, a pair of orifices 46 are provided in spacing sleeve 42 which aligned with and are generally conterminous to the perimeters of orifices 44 on the upper and lower opposite sides of the support shaft 38. Thus the two pairs of orifices 44 and 46 are each in-line vertically providing a direct optical viewing path or line of sight from above the grapple means to the area immediate below.

To illuminate the area immediately beneath the grapple means for facilitating its operation under water by an overhead remote operation above the water's surface, lighting means are preferably associated with the fuel handling system or mechanism. In accordance with invention at least one light source is located within the generally horizontal support shaft 38 contained within grapple housing 28. A light source 48 is positioned inside either or both end areas of support shaft 38 which are surrounded by rotatably mounted sleeves 40 carrying grapple hooks 30. To enable the light source 48 to illuminate the area beneath the grapple hooks 30 for effective viewing by an overhead operator, orifices 50 and 54 are respectively provided in the lower portion of the support shaft 38 and also in a lower portion of the immediate surrounding sleeve 40 rotatably mounted on the shaft and carrying a grapple hook 30. The orifices 50 and 54 respectively in the lower portion of the shaft 38 and sleeve 40 are in alignment and generally conterminous in perimeters when sleeves 40 are rotated in a limited arc with the grapple hooks 30 pivoted back away from each other in a retracted position for release of an object form the grasp of the hooks. When the sleeve 40 is so positioned, light from the source 48 beams downward illuminating the area below the grapple head 26.

One or more partitions 54 is provided within support shaft 38 between the light source 48 and the central portion of the shaft 38 containing the viewing orifices 44, and 46. This arrangement blocks light from the light source 48 from entering into the line of vision passing between the orifices 44 and 46 and thereby obscuring the field of view beneath the grapple head 26 and hooks 30 while fully illuminating the area beneath the grapple head 26 and 30 for enhanced operator vision.

The measures of this invention provide for direct viewing and/or illuminating of an underwater object such as a fuel bundle through the grapple head and hooks depending therefrom without any need for fiber optics, light pipes or mirrors, and the like.

What is claimed is:

1. A fuel handling system for nuclear reactor plants comprising a reactor vessel having an openable top and removable cover and containing therein, submerged in water substantially filling the reactor vessel, a fuel core including a multiplicity of fuel bundles formed of groups of sealed tube elements enclosing fissionable fuel assembled into units, the fuel handling system consisting essentially of the combination of:
   a fuel bundle handling platform movable over the open top of the reactor vessel;
   a fuel bundle handling mast extendable downward from the platform with a lower end projecting into the open top reactor vessel to the fuel core submerged in water;
   a grapple head mounted on the lower end of the mast provided with grapple means comprising complementary hooks which pivot inward toward each other to securely grasp a bail handle of a nuclear reactor fuel bundle and pivot backward away from each other to release a bail handle;
   said grapple means having a hollow cylindrical support shaft fixed within the grapple head with hollow cylindrical sleeves rotatably mounted and fixed in longitudinal axial position on the support shaft and each sleeve having complementary hooks secured thereto whereby each hook pivots with the rotation of the sleeve secured thereto; and
   said hollow cylindrical support shaft being provided with complementary orifices on opposite sides of its hollow cylindrical and intermediate to the sleeves mounted thereon whereby the orifices on both sides of the hollow cylindrical support shaft are vertically aligned providing a direct in-line optical viewing path downward therethrough and a remote operator positioned above the grapple means can observe from overhead the area immediately below the grapple hooks.

2. The fuel handling system for nuclear reactor plants of claim 1, wherein said hollow cylindrical support shaft and at least one sleeve rotatably mounted thereon are each provided with complementary orifices passing through their lower side and in alignment with each other thereby permitting a light source within the hollow cylindrical support shaft to radiate downward to illuminate the area beneath the grapple means.

3. The fuel handling system for nuclear reactor plants of claim 2, wherein a light source is provided within the hollow cylindrical support shaft adjoining the complimentary orifices passing in alignment through the lower side of the support shaft and a sleeve rotatably mounted thereon.

4. The fuel handling system for nuclear reactor plants of claim 1, wherein a light source is provided within the hollow cylindrical support shaft and said hollow cylindrical support shaft and a sleeve rotatably mounted thereon are provided with complimentary orifices passing through their lower side and in alignment with each other thereby permitting light form the source within the hollow cylindrical support shaft to radiate downward to illuminate the area beneath the grapple means.

5. A fuel handling system for nuclear reactor plants comprising a reactor vessel having an openable top and removable cover for refueling and containing therein, submerged in water substantially filling the reactor vessel, a fuel core including a multiplicity of fuel bundles formed of groups of sealed tube elements enclosing fissionable fuel assembled into units, the fuel handling system consisting essentially of the combination of:
   a fuel bundle handling platform moveable over the open top of the reactor vessel;
   a fuel bundle handling mast extendable downward from the platform with a lower end projecting into the open top reactor vessel to the fuel core submerged in water;
   a grapple head mounted on the lower end of the mast provided with grapple means comprising a pair of complementary hooks which pivot inward towards each other to securely grasp a bail handle of a nuclear rector fuel bundle and pivot backward away from each other to release a bail handle;
   said grapple means having a generally horizontally positioned hollow cylindrical support shaft fixed within the grapple head with a pair of hollow cylindrical sleeves rotatably mounted spaced apart and fixed in longitudinal axial positions on the generally horizontal support shaft and each sleeve having one of the pair of complementary hooks secured thereto whereby each hook pivots with the rotation of the sleeve secured thereto; and said hollow cylindrical support shaft being provided with complementary orifices intermediate of the rotating sleeves secured to the hooks with one orifice located on the upper side of the generally horizontal supporting shaft and the other orifice located on the lower side thereof whereby the orifices on opposite sides of the hollow cylindrical support shaft are vertically aligned providing a direct in-line optical viewing path downward therethrough and a remote operator positioned above the grapple means can observe from overhead the area immediately below the grapple hooks.

6. The fuel handling system for nuclear reactor plants of claim 5, wherein an intermediate sleeve member is mounted on the generally horizontal positioned hollow cylindrical support shaft between the pair of hollow cylindrical sleeves secured to the hooks and rotatably mounted on the support shaft and said intermediate sleeve member is provided with a pair of complementary orifices aligned with and generally conterminous to the orifices on the opposite side of the hollow cylindrical support shaft whereby a direct in-line optical viewing path downward through the intermediate sleeve member and the support shaft is provided and a remote operator positioned above the grapple means can observe from overhead the area immediately below the grapple hooks.

7. The fuel handing system for nuclear reactor plants of claim 6, wherein said hollow cylindrical support shaft and at least one sleeve rotatably mounted therein are each provided with complementary orifices passing through their lower side and in alignment with each other thereby permitting a light source within the hollow cylindrical support shaft to radiate downward to illuminate the area beneath the grapple means.

8. The fuel handling system for nuclear reactor plants of claim 7, wherein a light source is provide within the hollow cylindrical support shaft adjoining the complementary orifices passing in alignment with each other through the lower side of the support shaft and a sleeve rotatably mounted thereon.

9. The fuel handling system for nuclear reactor plants of claim 5, wherein at least one light source is provided within and adjacent to an end of the hollow cylindrical support shaft and said hollow cylindrical support shaft and both sleeves rotatably mounted thereon are provided with complimentary orifices passing through their lower side and in alignment with each other thereby permitting light from the source within the hollow cylindrical support shaft to radiate downward to illuminate the area beneath the grapple means.

10. A fuel handling system for nuclear reactor plants comprising a reactor vessel having an openable top and removable cover for refueling and containing therein, submerged in coolant water substantially filling the reactor vessel, a fuel core including a multiplicity of fuel bundles formed of groups of sealed tube elements enclosing fissionable fuel assembled into units, the fuel handling system consisting essentially of the combination of:

a fuel bundle handling platform moveable over the open top of the reactor vessel;

a fuel bundle handling mast extendable downward from the platform with a lower end projecting into the open top reactor vessel to the fuel core submerged in water;

a grapple head mounted on the lower end of the mast provided with a downward directed remote viewing camera and grappling hook means comprising a pair of complementary hooks which pivot inwards towards each other to securely grasp a bail handle of a nuclear reactor fuel bundle and pivot backward away from each other to release a bail handle, the camera being positioned above and directed to view downward between the pair of complementary hooks;

said grapple means having a generally horizontally positioned hollow cylindrical support shaft fixed within the grapple head and a pair of hollow cylindrical sleeves rotatably mounted spaced apart and fixed in longitudinal axial position on the generally horizontal support shaft with each sleeve having one of the pair of complementary hooks secured thereto whereby each hook pivots with the rotation of the sleeve secured thereto; and said hollow cylindrical support shaft being provided with complementary orifices with one located on the upper side of the generally horizontal supporting shaft and the other located on the lower side thereof and intermediate of the rotating sleeves secured to the hooks and mounted thereon whereby the orifices on opposite sides of the hollow cylindrical support shaft are vertically aligned providing a direct in-line optical viewing path downward therethrough by the camera located above within the grapple head and a remote operator positioned above the grapple means can observe through the camera from overhead the area immediately below the grapple hooks.

* * * * *